United States Patent [19]

Lin

[11] 4,418,108
[45] Nov. 29, 1983

[54] COMPOSITE ROOFING PANEL

[75] Inventor: David C. K. Lin, Newark, Ohio

[73] Assignee: Owens-Corning Fiberglas Corporation, Toledo, Ohio

[21] Appl. No.: 346,696

[22] Filed: Feb. 8, 1982

[51] Int. Cl.³ .............................. B32B 3/10; B32B 5/20
[52] U.S. Cl. ....................................... 428/139; 156/78; 428/285; 428/286; 428/304.4; 428/306.6; 428/316.6
[58] Field of Search ............... 428/137, 139, 141, 142, 428/304.4, 306.6, 316.6, 140, 143, 284, 286, 255, 332, 285; 156/71, 78; 427/186

[56] References Cited

U.S. PATENT DOCUMENTS 4,088,805  5/1978  Wiegand ............................ 428/139
4,229,473 10/1980  Elber ................................... 428/140
4,279,958  7/1981  Ahmad ................................ 428/248

FOREIGN PATENT DOCUMENTS 6917630  5/1971  Netherlands ..................... 428/319.1

Primary Examiner—Paul J. Thibodeau
Attorney, Agent, or Firm—Ronald C. Hudgens; Ted C. Gillespie; Paul J. Rose

[57] ABSTRACT

A composite panel including a fibrous glass board and foamed-in-place plastic foam has a perforated sheet at the foam-fiberglass interface, there being at least two holes per square inch in the perforated sheet, the diameter of the holes being less than 0.06 of an inch, and the amount of open area represented by the holes being less than 1.5 percent of the total area of the sheet.

6 Claims, 1 Drawing Figure

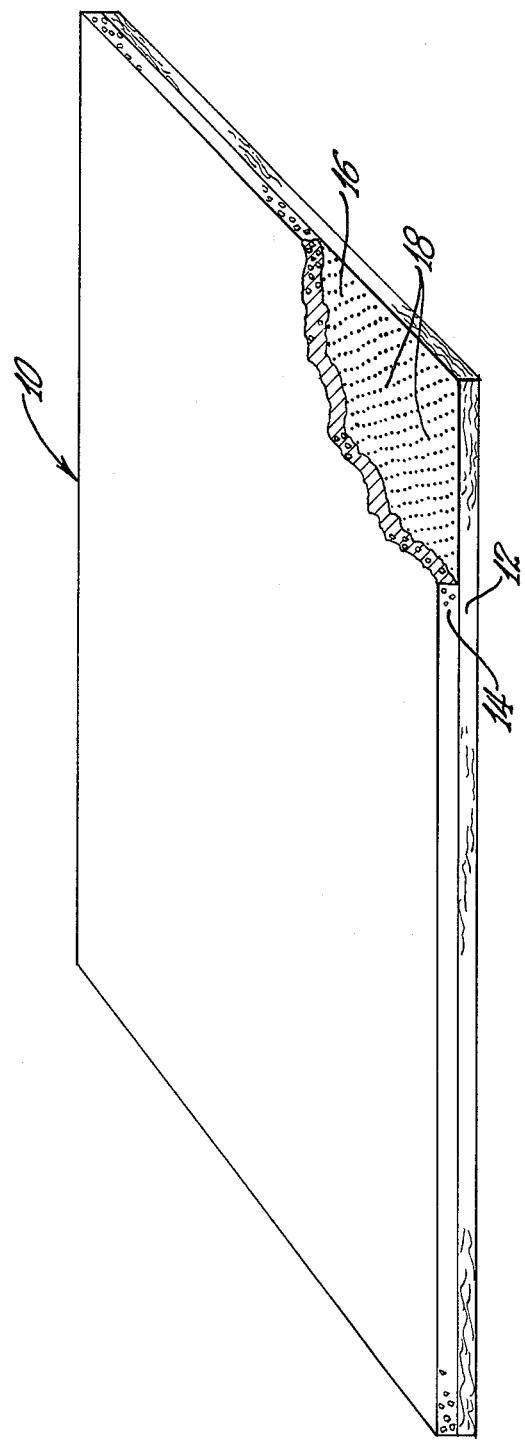

COMPOSITE ROOFING PANEL

TECHNICAL FIELD

This invention relates generally to composite panels for roof insulation, and more particularly to composite panels including a lower layer of fibrous glass board and an upper layer of foamed-in-place plastic foam.

BACKGROUND ART

U.S. Pat. No. 4,279,958 discloses a composite panel wherein a non-woven rayon mat (3,21) is disposed between a layer of fibrous glass board and a layer of foamed-in-place urethane foam. While the non-woven mat limits penetration of the foam into the fibrous glass board, it nevertheless permits penetration of more foam into the board than is necessary to establish a good bond.

DISCLOSURE OF THE INVENTION

In accordance with the invention, a composite roofing panel is provided wherein a perforated sheet is disposed between a fibrous glass board and foamed-in-place plastic foam. The holes in the perforated sheet are smaller than a certain maximum size, and the percentage of open area represented by the holes is below a certain maximum percent.

BRIEF DESCRIPTION OF DRAWING

The invention is described hereinafter in greater detail with reference to the accompanying drawing wherein a composite roofing panel is illustrated in a partially broken away perspective view.

BEST MODE OF CARRYING OUT THE INVENTION

The drawing shows a composite roofing panel 10 constructed in accordance with the invention and comprising a fibrous glass board 12, a layer of foamed-in-place plastic foam 14, and a perforated sheet 16 disposed between the board 12 and the plastic foam 14.

In a commercial product line, the fibrous glass board has a thickness of eleven-sixteenths (11/16) of an inch and the foam has a range of thickness of from seven-eigths ($\frac{7}{8}$) to two and three-fourths (2$\frac{3}{4}$) inches. In other words, panels 10 are furnished in various thicknesses ranging from one and nine-sixteenths (1-9/16) to three and seven-sixteenths (3-7/16) inches, the thickness of the foam being the varying factor and the fibrous glass board being eleven-sixteenths of an inch thick in each of the products with different total thicknesses.

The sheet 16 is provided with a plurality of circular holes or perforations 18 laid out in any suitable pattern resulting in generally uniform distribution. The sheet 16 may be made of any suitable material such as paper, waxed paper, thermoplastic film such as polyethylene, polypropylene, etc. One material which works particularly well because of its high strength and good dimensional stability is polyethyleneterephthalate film having a thickness of 0.0005 of an inch. The holes 18 should be 0.46 or less of an inch in diameter. Further, there should be at least two holes per square inch, but the amount of open area represented by the holes should be less than 1.5 percent of the total area. In general, the smaller the amount of open area is in the sheet 16, the greater is the amount of foam saved, and the greater the number of holes is per square inch, the greater is the bond strength at the interface of the foam and fibrous glass board.

A plastic film with holes having a diameter of 0.046 of an inch and an open area of 0.5 percent, or approximately three holes per square inch, when used in place of the former non-woven rayon mat in a panel 10 of 1-9/16 inches thickness ($\frac{7}{8}$ of an inch foam thickness), resulted in a saving of 16 to 17 percent in foam. The amount of foam saved decreased with increasing foam thickness. In a panel of 1-13/16 inches thickness (1$\frac{1}{8}$ inches foam thickness) the foam saving was 12 percent; in a panel of 2$\frac{1}{2}$ inches thickness (1-13/16 inches foam thickness), the foam saving was 6 percent; and in a panel of 3-7/16 inches thickness (2$\frac{3}{4}$ inches foam thickness), no foam was saved. In each case, however, the bond strength at the interface was sufficiently high that failure occurred not at the interface, but within the fibrous glass board.

For the 1-9/16 inch thick panel, the saving in foam was 14 percent when a plastic film with holes having a diameter of 0.046 of an inch and an open area of 0.85 percent, or approximately five holes per square inch, was used in place of the former non-woven rayon mat.

Various modifications may be made in the structures shown and described without departing from the spirit and scope of the invention.

I claim:

1. A composite panel for roof insulation, said panel comprising a fibrous glass board susceptible to penetration of foamable liquid thereinto when foamable liquid is placed on an upper surface thereof, a generally uniformly perforated sheet on the upper surface of the board for limiting penetration of foamable liquid thereinto during manufacture of the panel while allowing bonding of foam thereto at the perforations, and a layer of plastic foam foamed and cured in place from foamable liquid placed on top of the perforated sheet, the perforated sheet having at least two generally circular holes per square inch, the diameter of the holes of the perforated sheet being 0.46 of an inch or less, and the amount of open area represented by the holes being less than 1.5 percent of the total area of the sheet.

2. A panel as claimed in claim 1 wherein the holes of the perforated sheet are substantially 0.046 of an inch in diameter and there are approximately three holes per square inch, resulting in an open area of about 0.5 percent.

3. A panel as claimed in claim 1 wherein the holes of the perforated sheet are substantially 0.046 of an inch in diameter and there are approximately five holes per square inch, resulting in an open area of about 0.85 percent.

4. A panel as claimed in claim 1 wherein the perforated sheet is polyethyleneterephthalate film.

5. A panel as claimed in claim 4 wherein the film has a thickness of 0.0005 of an inch.

6. A panel as claimed in claim 1 wherein the perforated sheet is a thermoplastic film.

* * * * *